United States Patent
Li et al.

(10) Patent No.: US 10,359,886 B2
(45) Date of Patent: Jul. 23, 2019

(54) COMMON MODE NOISE PROCESSING METHOD AND APPARATUS

(71) Applicant: SHENZHEN GOODIX TECHNOLOGY CO., LTD., Shenzhen (CN)

(72) Inventors: Huafei Li, Shenzhen (CN); Yanan Wen, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 74 days.

(21) Appl. No.: 15/715,154

(22) Filed: Sep. 25, 2017

(65) Prior Publication Data
US 2018/0039379 A1    Feb. 8, 2018

Related U.S. Application Data

(63) Continuation of application No. PCT/CN2016/093899, filed on Aug. 8, 2016.

(51) Int. Cl.
*G06K 1/00* (2006.01)
*G06F 3/041* (2006.01)
(Continued)

(52) U.S. Cl.
CPC ............ *G06F 3/0418* (2013.01); *G06F 3/044* (2013.01); *G06K 9/0053* (2013.01)

(58) Field of Classification Search
CPC . G06F 3/041; G06F 3/044; G06F 1/00; G06F 3/0416; G06F 3/0412
See application file for complete search history.

(56) References Cited

U.S. PATENT DOCUMENTS

2013/0027091 A1    1/2013  Chu et al.
2014/0152614 A1*   6/2014  Choi .................... G06F 3/0418
                                                    345/174
(Continued)

FOREIGN PATENT DOCUMENTS

CN    102902393 A     1/2013
CN    103441973 A    12/2013
(Continued)

OTHER PUBLICATIONS

International Search Report for International Application No. PCT/CN2016/093899, Applicant: Shenzhen Goodix Technology Co., Ltd., May 11, 2017, 5 pages.

*Primary Examiner* — Michael A Faragalla

(57) ABSTRACT

A common mode noise processing apparatus is provided. The common mode noise processing apparatus includes s subtraction processing units (210-1 to 210-*s*) and one spectrum analysis module (220); each of the subtraction processing units (210-1 to 210-*s*) includes two first input ports (211-1 to 211-*s*, 212-1 to 212-*s*) connected to the subtractor, one subtractor (213-1 to 213-*s*) and one first output port (214-1 to 214-*s*) connected to the subtractor; the spectrum analysis module (220) includes s second input ports (221-1 to 221-*s*) connected to the s first output ports in one-to-one correspondence and at least one spectrum analysis unit (222) connected to the s second input ports (221). The common mode noise processing apparatus may be capable of detecting a common mode noise in a signal for determining a location of a touch point, so as to reduce impact of the common mode noise on the signal.

15 Claims, 5 Drawing Sheets

(51) Int. Cl.
*G06F 3/044* (2006.01)
*G06K 9/00* (2006.01)

(56) References Cited

U.S. PATENT DOCUMENTS

| | | |
|---|---|---|
| 2015/0138145 A1 | 5/2015 | Hwang et al. |
| 2015/0153868 A1* | 6/2015 | Tiew ................... G06F 3/0416 |
| | | 345/174 |
| 2016/0132147 A1 | 5/2016 | Lim |

FOREIGN PATENT DOCUMENTS

| | | |
|---|---|---|
| CN | 103853404 A | 6/2014 |
| CN | 104679366 A | 6/2015 |
| JP | H03226677 A | 10/1991 |
| JP | 2011233109 A | 11/2011 |
| JP | 2015118553 A | 6/2015 |
| KR | 20130078142 A | 7/2013 |
| KR | 20160006345 A | 1/2016 |
| TW | 201617819 A | 5/2016 |

\* cited by examiner

COMMON MODE NOISE PROCESSING METHOD AND APPARATUS

CROSS REFERENCE TO RELATED APPLICATIONS

The present application is a continuation of international application No. PCT/CN2016/093899 filed on Aug. 8, 2016, which is hereby incorporated by reference in its entirety.

TECHNICAL FIELD

The present disclosure relates to the field of electronic products, and in particular, to a common mode noise processing method
and apparatus.

BACKGROUND

With the touch screen products entering into people's lives, it is gradually found that when a touch screen is touched, false point reporting usually occurs or the touch screen may fail to recognize the touch, or touch reporting has generated even before a touch screen product is touched by a finger. Above problems are generally caused by interference of a common mode noise to the touch screen.

For example, a scanning channel of a current capacitive touch panel is usually divided into a driving channel and a sensing channel. A touch control chip transmits a driving signal to the driving channel and receives a sensing signal through the sensing channel. When a common mode noise is superimposed on the driving signal, the sensing signal received by the sensing channel will change. In the case, the touch control chip will receive a false sensing signal, so that inaccurate point reporting will occur. Therefore, in order to improve accuracy of touch reporting generated by the touch chip, it needs to reduce impact of a common mode noise, and before that, the common mode noise needs to be detected.

SUMMARY

The present disclosure provides a processing method for a common mode noise, a common mode noise processing apparatus and a touch controller, which are capable of detecting a common mode noise in a signal output by a touch screen for determining a location of a touch point, so as to reduce impact of the common mode noise on a driving signal input in a sensing channel, and finally improving accuracy of point reporting generated by a touch controller.

According to a first aspect, the present disclosure provides a common mode noise processing apparatus, including s subtraction processing units and one spectrum analysis module, where s is an integer greater than 0; each of the subtraction processing units includes two first input ports, one subtractor and one first output port, where the two first input ports are connected to the subtractor, and the subtractor is connected to the first output port; the spectrum analysis module includes s second input ports and at least one spectrum analysis unit, where the s second input ports are connected to the at least one spectrum analysis unit; s first output ports of the s subtraction processing units are connected to the s second input ports of the spectrum analysis module in one-to-one correspondence; the two first input ports in each of the subtraction processing units are configured to receive two first signals output by two output ports of a touch screen, the subtractor is configured to perform a subtraction between the two first signals received by the two first input ports to obtain a common mode noise of the two first signals, the first output port is configured to output the common mode noise of the two first signals to a connected second input port in the spectrum analysis module, and the first signal is a signal for determining a location of a touch point on the touch screen; each of the second input ports in the spectrum analysis module is configured to receive the common mode noise output by the connected first output port, and the at least one spectrum analysis unit is configured to perform a spectral analysis on s common mode noises received by the s second input ports to obtain a frequency component amplitude of at least one frequency component of the s common mode noises.

In an embodiment of the present disclosure, a subtraction is performed between signals in a plurality of sensing signals output by a touch screen, that is, a subtraction processing is performed, to obtain common mode noises of two signals, respectively, and then a spectrum analysis is performed on these common mode noises to obtain a frequency component amplitude of frequency components of the common mode noises, so that subsequently one or more frequency bands may be selected from a plurality of preconfigured frequency bands according to the frequency component amplitude. A touch controller may then output a driving signal that a frequency within the frequency bands when outputting driving signals to a touch panel next time, so as to reduce impact of the common mode noises on the driving signal, thus improving accuracy of a sensing signal, and finally improving accuracy of point reporting generated by the touch controller.

In one possible example, each of the subtraction processing units may include two AFEs; the two AFEs are connected to the two first input ports in one-to-one correspondence, and the two AFEs are connected to the subtractor; the two AFEs are configured to amplify the two first signals received by the two first input ports to obtain two amplified signals and output the two amplified signals to the subtractor; and the subtractor is specifically configured to perform a subtraction between the two amplified signals output by the two AFEs to obtain a common mode noise of the two amplified signals.

In one possible example, each of the subtraction processing units includes two analog-digital converters ADCs; the two AFEs are connected to the two ADCs in one-to-one correspondence, and the two ADCs are connected to the subtractor; the two ADCs are configured to sample the two amplified signals output by the two AFEs to obtain two digital signals; and the subtractor is specifically configured to perform a subtraction between the two digital signals output by the two ADCs to obtain a common mode noise of the two digital signals.

In one possible example, each of the subtraction processing units further includes one AFE; the subtractor is connected to the AFE, and the AFE is connected to the first output port; the AFE is configured to amplify the common mode noise of the two first signals output by the subtractor to obtain an amplified common mode noise; and the first output port is specifically configured to output the amplified common mode noise to the connected second input port.

In one possible example, each of the subtraction processing units further includes one ADC; the AFE is connected to the ADC, and the ADC is connected to the first output port; the ADC is configured to sample the amplified common mode noise output by the AFE to obtain a digital common mode noise; and the first output port is specifically configured to output the digital common mode noise to the connected second input port.

In one possible example, the spectrum analysis module includes one spectrum analysis unit, and the spectrum analysis module further includes an adder; the s second input ports are connected to the adder, and the adder is connected to the spectrum analysis unit; the adder is configured to add s common mode noises received by the s second input ports to obtain an accumulated common mode noise; and the spectrum analysis unit is configured to perform a spectral analysis on the accumulated common mode noise to obtain a frequency component amplitude of at least one frequency component of the accumulated common mode noise.

In one possible example, the spectrum analysis module includes s spectrum analysis units, and the s spectrum analysis units are connected to the s second input ports in one-to-one correspondence; each of the spectrum analysis units is configured to perform a spectral analysis on the common mode noise received by a connected second input port to obtain a frequency component amplitude of at least one frequency component of the common mode noise received by the connected second input port.

In one possible example, the touch screen is a capacitive touch screen, and the first signal is a sensing signal output by a sensing channel of the capacitive touch screen.

In one possible example, the common mode noise processing apparatus further includes a frequency determination module configured to determine a frequency band within which a driving signal in a driving channel of the capacitive touch screen is located according to the frequency component amplitude.

According to a second aspect, the present disclosure provides a processing method for a common mode noise, where the processing method is executed by the common mode noise processing apparatus in the first aspect, and the processing method includes: receiving, by two first input ports of each of subtraction processing units, two first signals output by two output ports of a touch screen, where the first signal is a signal for determining a location of a touch point on the touch screen; performing, by a subtractor of each of the subtraction processing units, a subtraction between the two first signals received by the two first input ports to obtain a common mode noise of the two first signals; outputting, by a first output port of each of the subtraction processing units, the common mode noise to the connected second input port in the spectrum analysis module; receiving, by each of second input ports, the common mode noise output by the connected first output port; and performing, by at least one spectrum analysis unit, a spectral analysis on s common mode noises received by s second input ports to obtain a frequency component amplitude of at least one frequency component of the s common mode noises.

According to a third aspect, the present disclosure provides a touch controller, including a common mode noise processing apparatus and a control apparatus according to the first aspect, where the common mode noise processing apparatus is configured to receive a sensing signal output by a touch screen for determining a location of a touch point on the touch screen and acquire a frequency component amplitude of a common mode noise of the sensing signal; the control apparatus is configured to determine a frequency band within which a driving signal in a driving channel of the touch screen is located according to the frequency component amplitude and output a driving signal located in the frequency band to the driving channel of the touch screen.

BRIEF DESCRIPTION OF DRAWINGS

To describe the technical solutions in the embodiments of the present disclosure more clearly, the following briefly introduces the drawings required for describing the embodiments. Apparently, the drawings described below show some embodiments of the present disclosure only, and persons of ordinary skill in the art may still derive other drawings from these drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

For ease of understanding, an example of an application scenario of a common mode noise processing apparatus capable of implementing an embodiment of the present disclosure is described as a whole. It should be understood that the embodiment of the present disclosure is not limited to a system architecture shown in FIG. 1. In addition, an apparatus in FIG. 1 may be hardware, or software divided functionally, or a combination of the two.

Figure 1:
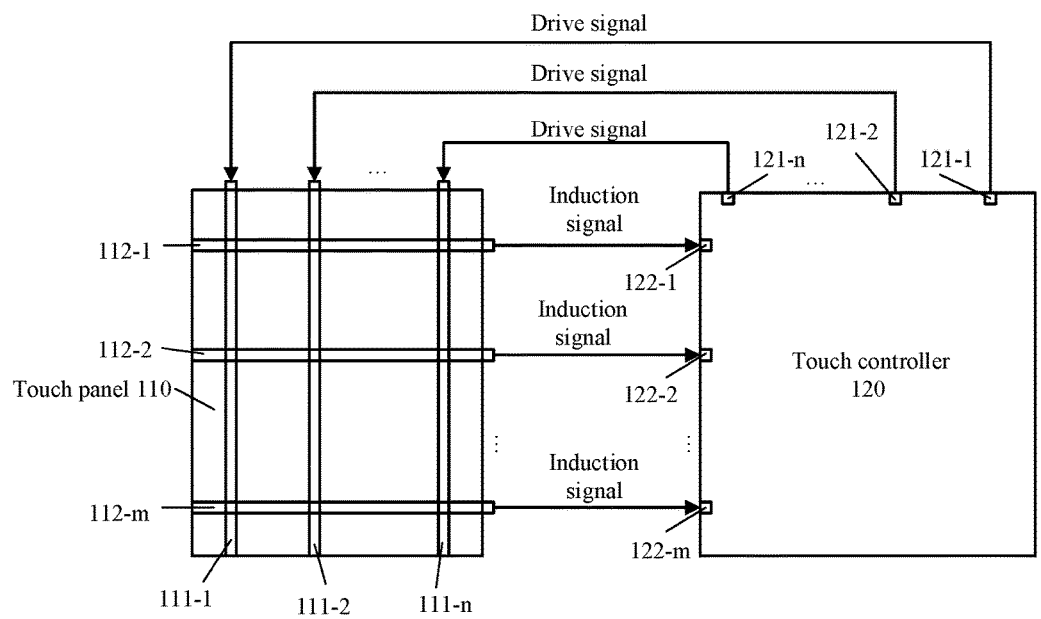
FIG. 1 is a schematic diagram of an application scenario of a processing method for a common mode noise of an embodiment of the present disclosure.

A system shown in FIG. 1 includes a touch panel 110 and a touch controller 120. The touch panel may also be called a touch screen. The touch panel 110 may be a capacitive touch screen, more specifically, a projected mutual capacitive touch screen. The touch panel 110 includes n driving channels (111-1 to 111-n) and m sensing channels (112-1 to 112-m). The touch controller 120 includes n output ports (121-1 to 121-n) and m input ports (122-1 to 122-m).

The touch controller 120 may also be called a touch control chip, which includes n output ports (121-1 to 121-n), where the n output ports (121-1 to 121-n) are connected to the n driving channels (111-1 to 111-*n*) of the touch panel 110 in one-to-one correspondence, and the m input ports (122-1 to 122-*m*) of the touch controller 120 are connected to the m sensing channels (112-1 to 112-*m*) of the touch panel 110 in one-to-one correspondence. When driving signals are output from the n output ports (121-1 to 121-*n*) of the touch controller 120, the n driving channels (111-1 to 111-*n*) of the touch panel 110 receive the driving signals. The m sensing channels (112-1 to 112-*m*) of the touch panel 110 sequentially receive sensing signals and then the m input ports (122-1 to 122-*m*) of the touch controller 120 receive the sensing signals output by the connected sensing channels. Next, the touch controller 120 may perform point reporting based on signals received by the m input ports, where the point reporting means to calculate a location of a touch point on the touch panel.

However, when the driving signals are output from the touch controller 120 to the touch panel 110, the driving signals may be superimposed with a common mode noise, thereby affecting the sensing signals received by the sensing channels of the touch panel, and eventually resulting in inaccurate point reporting generated from the touch controller 120. The common mode noise generally means noises with equal amplitude and same phase on two actual lines.

Therefore, according to the common mode noise processing apparatus and the processing method for a common mode noise provided in the embodiment of the present disclosure, a common mode noise in a sensing signal may be detected first, and then a frequency component amplitude of the common mode noise may be obtained, so that subsequently a frequency band within which a driving signal is located may be determined according to the frequency component amplitude of the common mode noise.

Figure 2:
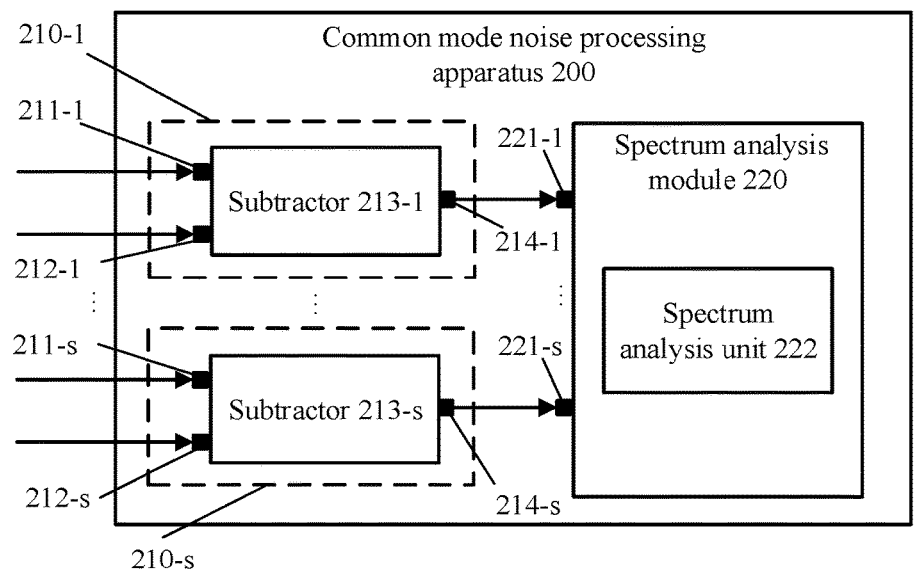
FIG. 2 is a schematic diagram of a structure of a common mode noise processing apparatus of an embodiment of the present disclosure.

FIG. 2 is a schematic diagram of a structure of a common mode noise processing apparatus of an embodiment of the present disclosure. It should be understood that the common mode noise processing apparatus 200 shown in FIG. 2 is merely an example, and the common mode noise processing apparatus of the embodiment of the present disclosure may further include other modules or units, or modules having similar functions to the modules in FIG. 2, or not all modules in FIG. 2 are required to be included.

The common mode noise processing apparatus 200 includes s subtraction processing units (210-1 to 210-*s*) and one spectrum analysis module 220, where s is an integer greater than 0.

Each of the subtraction processing units includes two first input ports, one subtractor and one first output port, where the two first input ports are connected to the subtractor, and the subtractor is connected to the first output port. For example, the s subtraction processing units include input port 211-*s*, input port 212-*s*, subtractor 213-*s*, output port 214-*s*, where input port 211-*s* and input port 212-*s* are connected to the subtractor 213-*s*, and the subtractor 213-*s* is connected to the output port 214-*s*. The above description of the ports and the subtractor is merely a manner for facilitating unified description of most embodiments of the disclosure, and should not be construed as that the subtractor processing unit must also include an additional input port and output port in addition to the input ports and output ports of the subtractor. The first input port and the first output port herein vary depending on specific embodiments. For example, in the case that the subtraction processing unit has a subtractor, the first input port and the first output port of the subtraction processing unit may be equivalent to the input port and output port of the subtractor itself. In the case that the subtraction processing unit includes other components or circuit modules other than the subtractor, the first input port and the first output port may be an input/output port of other components or circuit modules.

The spectrum analysis module 220 includes s second input ports (221-1 to 221-*s*) and a spectrum analysis unit 222. There may be one or more spectrum analysis units 222.

The first output port of each of the subtraction processing units is connected to one second input port of the spectrum analysis module, for example, output port 214-*s* of the Sth subtraction processing unit 210-*s* is connected to the Sth input port 221-*s* of the spectrum analysis module 220.

The two first input ports of each of the subtraction processing units are configured to receive two first signals output by a touch screen, the first signal is a signal for determining a location of a touch point on the touch screen, and the first signal may be a sensing signal output by a sensing channel of the touch screen. The touch screen may have a plurality of output ports for outputting the first signals, and the two first input ports of each subtraction processing unit are configured to receive first signals output by two output ports of the plurality of output ports for outputting the first signals on the touch screen. Optionally, the first signal may be a signal for determining a location of a touch point on the touch screen, such as any one of signals 1 to m in FIG. 1.

The subtractor of each of the subtraction processing units is configured to perform a subtraction between the two first signals received by the two first input ports which are connected to the subtractor to obtain a common mode noise of the two first signals. The first output port connected to the subtractor is configured to output the common mode noise of the two first signals to the second input port connected to the first output port in the spectrum analysis module.

In the spectrum analysis module, each of the second input ports is configured to receive the common mode noise output by the first output port connected to the second input port, and the spectrum analysis unit is configured to perform a spectral analysis on s common mode noises received by s second input ports to obtain a frequency component amplitude of at least one frequency component of the s common mode noises.

Based on the spectral analysis on the common mode noise, frequency components included in the common mode noise and frequency component amplitudes of these frequency components may be acquired.

In the embodiment of the present disclosure, a subtraction is performed between two first signals in a plurality of first signals output by a touch screen to obtain common mode noises of the two first signals, respectively, and then a spectrum analysis is performed on these common mode noises to obtain a frequency component amplitude of frequency components of the common mode noises, so that subsequently one frequency band may be selected from a plurality of preconfigured frequency bands according to the frequency component amplitude. A touch controller may then output a driving signal that a frequency is located in the frequency bands when outputting driving signals to a touch panel next time, so as to reduce impact of the common mode noises on the driving signals, thus improving accuracy of sensing signals, and finally improving accuracy of point reporting generated by a touch controller.

When the common mode noise processing apparatus 200 shown in FIG. 2 is used to process a common mode noise, a corresponding processing method for the common mode noise is specifically as follows: receiving, by the two first input ports of each of the subtraction processing units, the two first signals output by two output ports of the touch screen; performing, by the subtractor of each of the subtraction processing units, a subtraction between the two first signals received by the two first input ports which are connected to the subtractor to obtain a common mode noise of the two first signals; outputting, by the first output port of each of the subtraction processing units, the common mode noise obtained by the subtractor connected to the first output port to the second input port in the spectrum analysis module, where the second input port is connected to the first output port; receiving, by each of the second input ports of the spectrum analysis module, the common mode noise output by the first output port connected to the second input port; and performing, by the spectrum analysis unit in the spectrum analysis module, a spectral analysis on the s common mode noises received by the s second input ports to obtain a frequency component amplitude of at least one frequency component of the s common mode noises.

Figure 3:
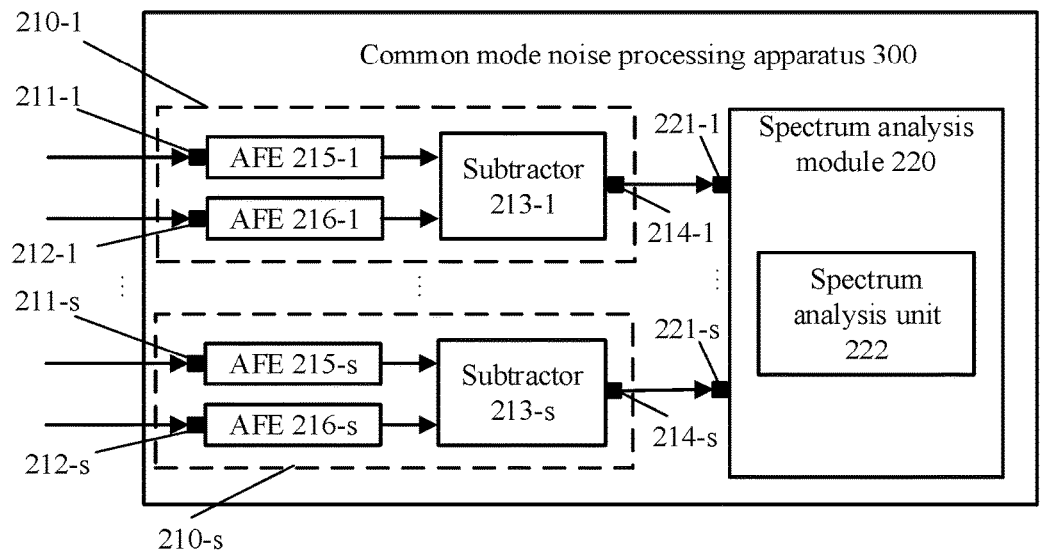
FIG. 3 is a schematic diagram of a structure of a common mode noise processing apparatus of an embodiment of the present disclosure.

Optionally, as shown in FIG. 3, in a common mode noise processing apparatus 300 of an embodiment of the present disclosure, each of subtraction processing units may include two analog front ends (Analog Front Ends, AFEs), for example, the Sth subtraction processing unit includes AFE 215-s and AFE 216-s.

The two AFEs of each of the subtraction processing units are connected to two first input ports, respectively, and the two AFEs are also connected to a subtractor, that is, the subtractor is connected to the two first input ports via the two AFEs. For example, in the Sth subtraction processor, AFE 215-s is connected to 211-s, AFE 216-s is connected to 212-s, and both AFE 215-s and AFE 216-s are connected to subtractor 213-s.

The two AFEs of each of the subtraction processing units are configured to amplify two first signals received by the two first input ports connected to the two AFEs to obtain two amplified signals and output the two amplified signals to the subtractor connected to the two AFEs.

In this case, the subtractor in each of the subtraction processing units is configured to perform a subtraction between the two first amplified signals output by the two AFEs connected to the subtractor to obtain a common mode noise of the two amplified signals.

When the common mode noise processing apparatus 300 shown in FIG. 3 is used to process a common mode noise, a processing method for the common mode noise is specifically as follows: receiving, by the two first input ports of each of the subtraction processing units, the two first signals output by two output ports of a touch screen; amplifying, by the two AFEs of each of the subtraction processing units, the two first signals received by the two first input ports which are connected to the two AFEs to obtain two amplified first signals and outputting the amplified first signals to the subtractor connected to the two AFEs; performing, by the subtractor, a subtraction between the two signals amplified by the two AFEs to obtain a common mode noise of the two amplified first signals; outputting, by the first output port of each of the subtraction processing units, the common mode noise obtained by the subtractor connected to the first output port to the second input port connected to the first output port in the spectrum analysis module; receiving, by each of the second input ports of the spectrum analysis module, the common mode noise output by the first output port connected to the second input port; and performing, by a spectrum analysis unit in the spectrum analysis module, a spectral analysis on s common mode noises received by s second input ports to obtain a frequency component amplitude of at least one frequency component of the s common mode noises.

Figure 4:
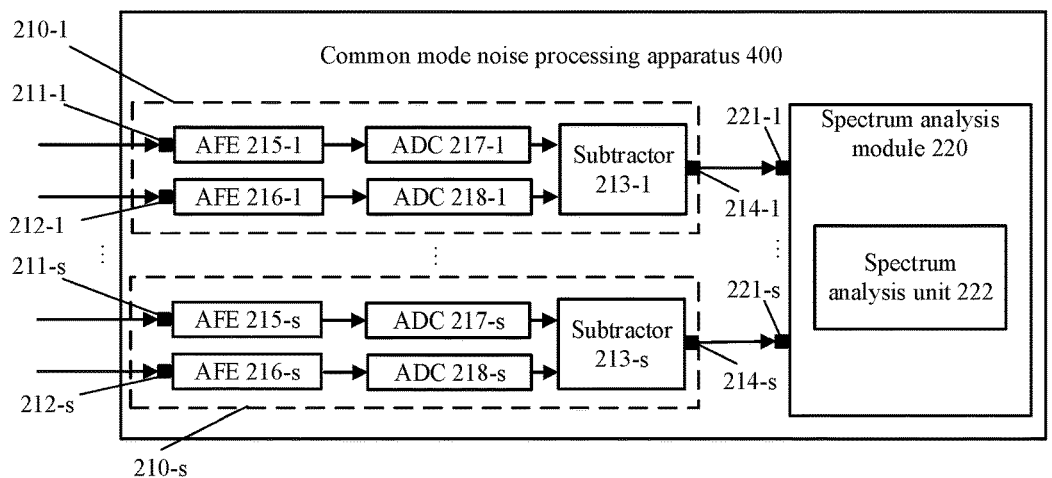
FIG. 4 is a schematic diagram of a structure of a common mode noise processing apparatus of an embodiment of the present disclosure.

Optionally, as shown in FIG. 4, in a common mode noise processing apparatus 400 of an embodiment of the present disclosure, each of subtraction processing units may further include two Analog to Digital Converters (ADCs). The two ADCs are connected to two AFEs in the common mode noise processing apparatus in one-to-one correspondence and the two ADCs are connected to the subtractor in the subtraction processing unit, that is, the two AFEs are connected to the subtractor via the two ADCs. For example, subtraction processing unit 210-s also includes ADC 217-s and ADC 218-s, and subtractor 213-s is connected to AFE 215-s and AFE 246-s via ADC 217-s and ADC 218-s.

The two ADCs in each of the subtraction processing units are configured to sample two amplified signals output by the two AFEs which are connected to the two ADCs to obtain two digital signals. The subtractor is specifically configured to perform a subtraction between the two digital signals output by the two ADCs to obtain a common mode noise of the digital signals.

When the common mode noise processing apparatus 400 shown in FIG. 4 is used to process a common mode noise, a processing method for the common mode noise is specifically as follows: receiving, by the two first input ports of each of the subtraction processing units, two first signals output by the two output ports of a touch screen; amplifying, by two AFEs of each of the subtraction processing units, the two first signals received by the two first input ports which are connected to the two AFEs to obtain two amplified first signals and outputting the two amplified first signals to the two ADCs connected to the two AFEs; sampling, by the two ADCs, the received and amplified first signals respectively, converting the first analog signals to digital signals, and transmitting the converted digital signals to the subtractor; performing, by the subtractor, a subtraction between the two digital signals sampled by the two ADCs to obtain a common mode noise of the two digital signals; outputting, by the first output port, the common mode noise obtained by the subtractor connected to the first output port to the second input port in the spectrum analysis module, where the second input port is connected to the first output port; receiving, by each of the second input ports of the spectrum analysis module, the common mode noise output by the first output port connected to the second input port; and performing, by a spectrum analysis unit in the spectrum analysis module, a spectral analysis on s amplified common mode noises received by s second input ports to obtain a frequency component amplitude of at least one frequency component of the s common mode noises.

Figure 5:
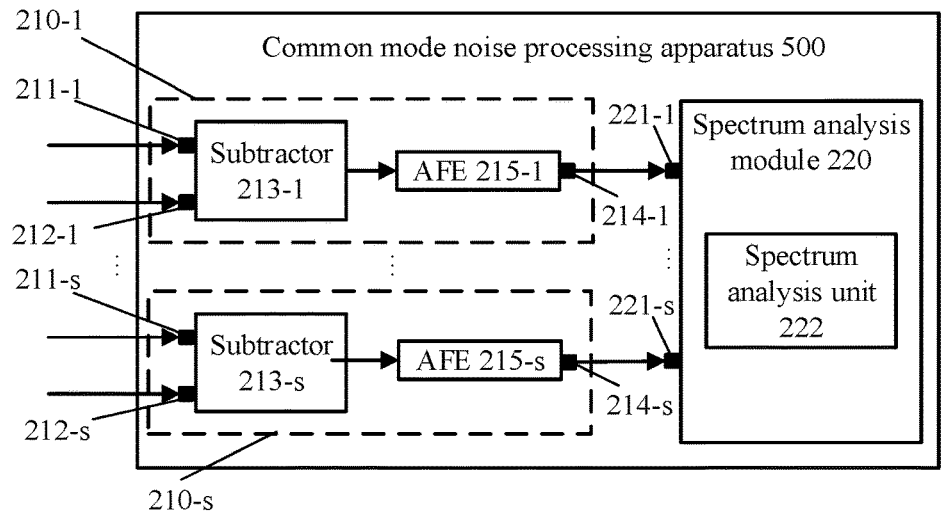
FIG. 5 is a schematic diagram of a structure of a common mode noise processing apparatus of an embodiment of the present disclosure.

Optionally, as shown in FIG. 5, in a common mode noise processing apparatus 500 of an embodiment of the present disclosure, each of subtraction processing units may further include one AFE. The AFE is connected to the subtractor, and the AFE is configured to amplify a common mode noise of two first signals output by the subtractor to obtain an amplified common mode noise. The AFE is also connected to the first output port of the subtraction processing unit. In this case, the first output port is specifically configured to output the common mode noise amplified by the AFE to the second input port connected to the first output port in a spectrum analysis module.

For example, subtraction processing unit 210-s further includes AFE 215-s, and subtractor 213-s is connected to first output port 214-s via AFE 215-s.

When the common mode noise processing apparatus 500 shown in FIG. 5 is used to process a common mode noise, a processing method for the common mode noise is specifically as follows: receiving, by two first input ports of each of the subtraction processing units, the two first signals output by two output ports of a touch screen; performing, by a subtractor of each of the subtraction processing units, a subtraction between the two first signals received by the two first input ports which are connected to the subtractor to obtain a common mode noise of the two first signals; amplifying, by the AFE, the common mode noise to obtain an amplified common mode noise; outputting, by the first output port of the subtraction processing unit, the amplified common mode noise amplified by the AFE which is connected to the first output port to the second input port connected to the first output port in the spectrum analysis module; receiving, by each of the second input ports of the spectrum analysis module, the amplified common mode noise output by the first output port connected to the second input port; and performing, by the spectrum analysis unit in the spectrum analysis module, a spectral analysis on s amplified common mode noises received by s second input ports to obtain a frequency component amplitude of at least one frequency component of s common mode noises.

Figure 6:
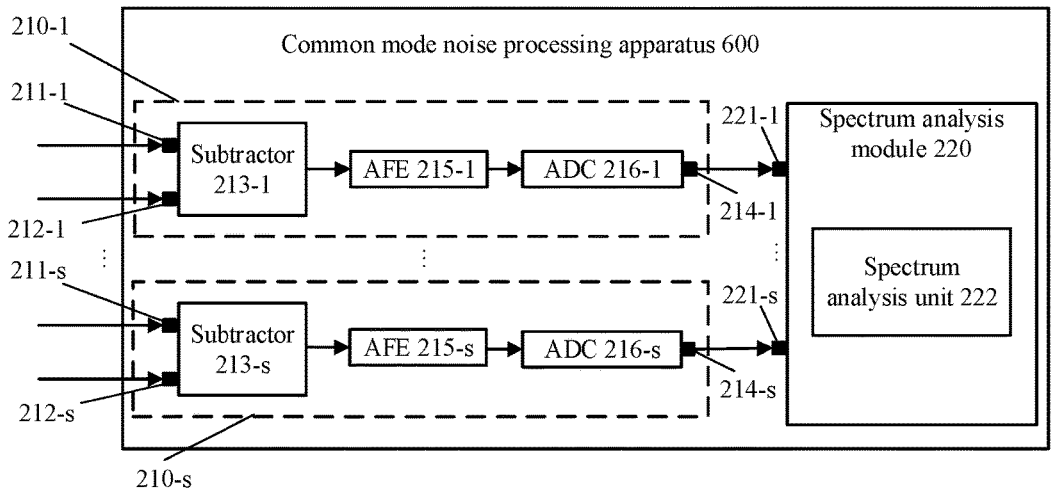
FIG. 6 is a schematic diagram of a structure of a common mode noise processing apparatus of an embodiment of the present disclosure.

Optionally, as shown in FIG. 6, in a common mode noise processing apparatus 600 of an embodiment of the present disclosure, each of subtraction processing units may further include one ADC. The ADC is connected to the AFE in the subtraction processing unit and is configured to sample the amplified common mode noise output by the AFE to obtain a digital common mode noise. The ADC is connected to the first output port of the subtraction processing unit. In this case, the first output port is specifically configured to output a digital common mode noise sampled by the ADC and output by the second input port connected to the first output port in a spectrum analysis module.

For example, subtraction processing unit 210-s further includes ADC 216-s, and AFE 215-s is connected to first output port 214-s via ADC 216-s.

When the common mode noise processing apparatus 600 shown in FIG. 6 is used to process a common mode noise, a processing method for the common mode noise is specifically as follows: receiving, by two first input ports of each of subtraction processing units, two first signals output by two output ports of a touch screen; performing, by a subtractor of a subtraction processing unit, a subtraction between the two first signals received by the two first input ports which are connected to the subtractor to obtain a common mode noise of the two first signals; amplifying, by the AFE, the common mode noise to obtain an amplified common mode noise; sampling, by the ADC, the amplified common mode noise to obtain a digital signal; outputting, by the first output port of the subtraction processing unit, the digital common mode noise sampled by the ADC which is connected to the first output port to the second input port connected to the first output port in the spectrum analysis module; receiving, by each of second input ports of the spectrum analysis module, the digital common mode noise output by the first output port connected to the second input port; and performing, by a spectrum analysis unit in the spectrum analysis module, a spectral analysis on s sampled digital common mode noises received by s second input ports to obtain a frequency component amplitude of at least one frequency component of s common mode noises.

Optionally, in the common mode noise processing apparatuses shown in FIGS. 2-6, the spectrum analysis module may specifically include one frequency analysis unit, and further include one adder. In the spectrum analysis module, s second input ports are connected to the adder and the adder is configured to add s common mode noises received by the s second input ports to obtain an accumulated common mode noise.

The adder is also connected to the spectrum analysis unit. In this case, the spectrum analysis unit is configured to perform a spectral analysis on the common mode noise accumulated by the adder to obtain a frequency component amplitude of at least one frequency component of the accumulated common mode noise.

Figure 7:
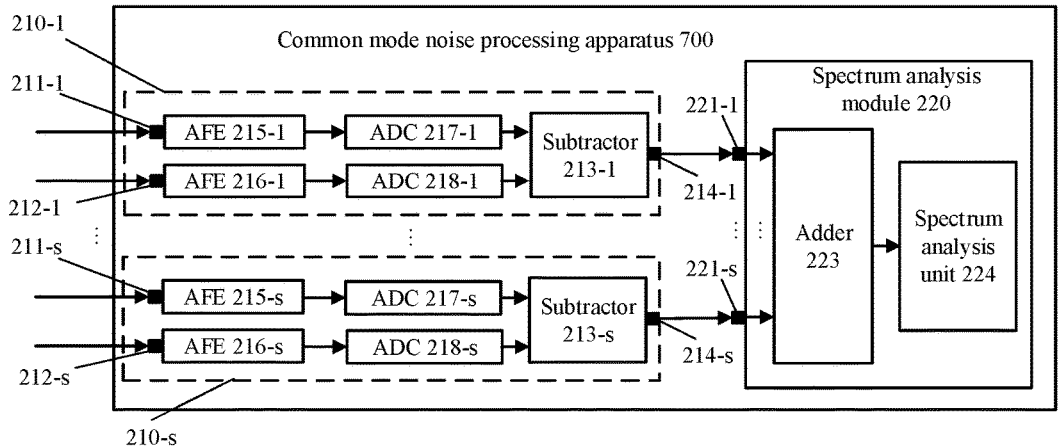
FIG. 7 is a schematic diagram of a structure of a common mode noise processing apparatus of an embodiment of the present disclosure.

For example, a structural diagram that the spectrum analysis module in the common mode noise processing apparatus 400 shown in FIG. 4 includes an adder is shown in FIG. 7. The spectrum analysis module 220 includes an adder 223 and a spectrum analysis unit 224, where the adder is connected to s second input ports (221-1 to 221-s).

When the common mode noise processing apparatus 700 shown in FIG. 7 is used to process a common mode noise, a processing method for the common mode noise is specifically as follows: receiving, by two first input ports of each of subtraction processing units, two first signals output by two output ports of a touch screen; amplifying, by two AFEs of each of the subtraction processing units, the two first signals received by the two first input ports which are connected to the two AFEs to obtain two amplified first signals and outputting the two amplified first signals to two ADCs connected to the two AFEs; sampling, by the two ADCs, the received and amplified first signals, converting the first analog signals to digital signals, and transmitting the converted digital signals to a subtractor; performing, by the subtractor, a subtraction between the two digital signals sampled by the two ADCs to obtain a common mode noise of the two digital signals; outputting, by the first output port, the common mode noise obtained by the subtractor which is connected to the first output port to the second input port in the spectrum analysis module, where the second input port is connected to the first output port; receiving, by each of second input ports of the spectrum analysis module, the common mode noise output by the first output port connected to the second input port; adding, by the adder of the spectrum analysis module, the common mode noises received by all the second input ports of the spectrum analysis module to obtain an accumulated common mode noise; and performing, by a spectrum analysis unit, a spectral analysis on the accumulated common mode noise to obtain a frequency component amplitude of at least one frequency component of the accumulated common mode noises.

Certainly, the common mode noise processing apparatus may include a plurality of adders and a plurality of spectrum analysis units corresponding to the plurality of adders, respectively. Each adder is configured to add common mode noises received by part of the second input ports, and a corresponding spectrum analysis unit performs a spectral analysis on the common mode noise added by the adder to obtain a frequency component amplitude of a frequency component of all common mode noises.

Optionally, in the common mode noise processing apparatuses shown in FIGS. 2-6, the spectrum analysis module may specifically include s frequency analysis units. In the spectrum analysis module, s second input ports are connected to the s frequency analysis units. In this case, each of the spectrum analysis unit is configured to perform a spectral analysis on a common mode noise received by a second input port connected to the spectrum analysis unit to obtain a frequency component amplitude of at least one frequency component of the common mode noise received by the second input port.

Figure 8:
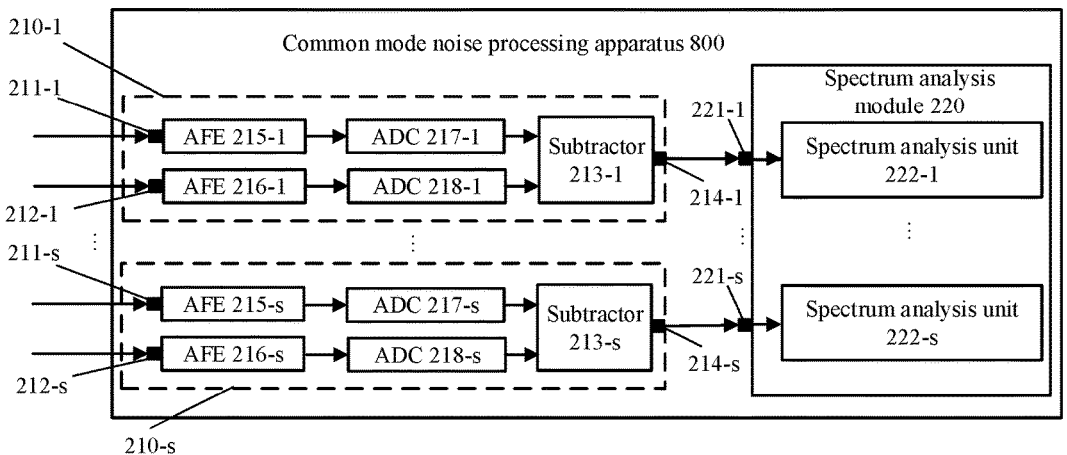
FIG. 8 is a schematic diagram of a structure of a common mode noise processing apparatus of an embodiment of the present disclosure.

For example, a structural diagram that the spectrum analysis module in the common mode noise processing apparatus 400 shown in FIG. 4 includes s frequency analysis units is shown in FIG. 8. Spectrum analysis module 220 includes s spectrum analysis units (222-1 to 222-$s$), where the s spectrum analysis units (222-1 to 222-$s$) are connected to s second input ports (221-1 to 221-$s$) in one-to-one correspondence.

When a common mode noise processing apparatus 800 shown in FIG. 8 is used to process a common mode noise, a processing method for the common mode noise is specifically as follows: receiving, by two first input ports of each of subtraction processing units, two first signals output by two output ports of a touch screen; amplifying, by two AFEs of each of the subtraction processing units, the two first signals received by the two first input ports which are connected to the two AFEs to obtain two amplified first signals and outputting the two amplified first signals to two ADCs connected to the two AFEs; sampling, by the two ADCs, the received and amplified first signals, converting the first analog signals to digital signals, and transmitting the converted digital signals to a subtractor; performing, by the subtractor, a subtraction between the two digital signals sampled by the two ADCs to obtain a common mode noise of the two digital signals; outputting, by the first output port, the common mode noise obtained by the subtractor connected to the first output port to the second input port connected to the first output port in the spectrum analysis module; receiving, by each of second input ports of the spectrum analysis module, the common mode noise output by the first output port connected to the second input port; and performing, by the s spectrum analysis units in the spectrum analysis module, a spectral analysis on common mode noises received by the s second input ports to obtain a frequency component amplitude of at least one frequency component of the common mode noises, respectively.

Optionally, in the common mode noise processing apparatus of the embodiment of the present disclosure shown in FIG. 2, two or more subtraction processing units may share an identical first input port.

Optionally, when a subtraction processing unit in a common mode noise processing apparatus of the embodiment of the present disclosure further includes an AFE, two or more subtraction processing units may share an identical first input port and an identical AFE.

Optionally, when a subtraction processing unit in a common mode noise processing apparatus of the embodiment of the present disclosure further includes an ADC, two or more subtraction processing units may share an identical first input port, an identical AFE and an identical ADC.

Figure 9:
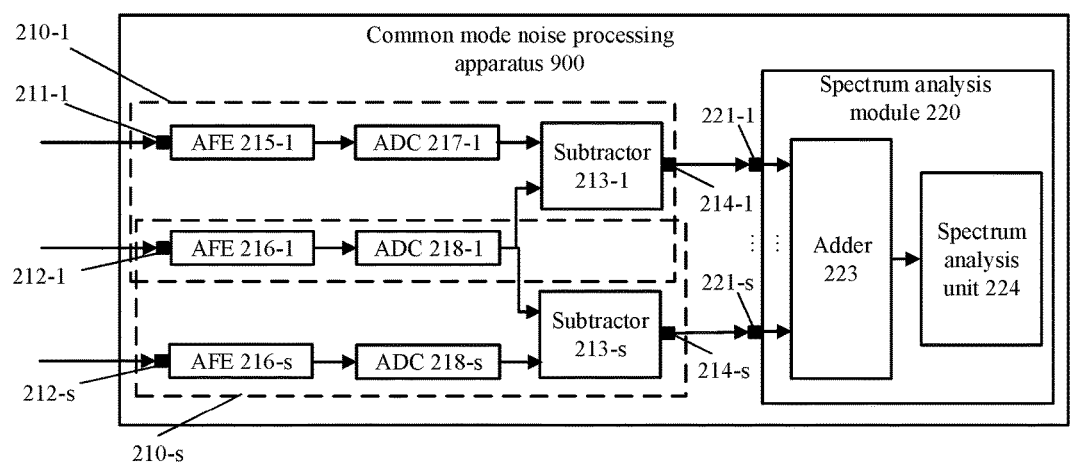
FIG. 9 is a schematic diagram of a structure of a common mode noise processing apparatus of an embodiment of the present disclosure.

For example, a structural diagram that subtraction processing unit 210-1 and subtraction processing unit 210-$s$ in the common mode noise processing apparatus 700 shown in FIG. 7 share an identical first input port, an identical AFE and an identical ADC is shown in FIG. 9.

In general, two or more subtraction processing units perform common mode noise processing on an identical first signal output by a touch screen.

In the common mode noise processing apparatus 900 shown in FIG. 9, subtraction processing unit 210-1 includes a first input port 211-1, another first input port 212-1, an AFE 215-1, another AFE 216-1, an ADC 217-1, another ADC 218-1, a subtractor 213-1 and a first output port 214-1; a subtraction processing unit 210-$s$ includes the first input port 212-1, another first input port 212-$s$, an AFE 216-1, another AFE 216-$s$, an ADC 218-1, another ADC 218-$s$, a subtractor 213-$s$ and a first output port 214-$s$, that is, subtraction processing units 210-1 shares the first input port 212-1, the AFE 216-1 and the ADC 218-1 with the subtraction processing unit 210-$s$.

In the embodiment of the present disclosure, optionally, when a spectrum analysis module performs a spectral analysis on a common mode noises to obtain a frequency component amplitude of a frequency component of the common mode noise, one frequency band, where the frequency band is called a first frequency band for convenience of subsequent description, may be determined from a plurality of preconfigured frequency bands according to the frequency component amplitude of a frequency component of at least one common mode noise obtained through the spectral analysis, so that a touch controller may output a driving signal that a frequency is located within the first frequency band to a touch panel.

In the embodiment of the present disclosure, in a case that a common mode noise processing apparatus is a separately deployed module, after obtaining a frequency component amplitude based on a spectrum analysis, the common mode noise processing apparatus may transmit information of the frequency component amplitude to a touch controller, and the touch controller selects a frequency band according to the frequency component amplitude, or the common mode noise processing apparatus selects a frequency band according to the frequency component amplitude and then transmits a signal of the selected frequency band to the touch controller.

Figure 10:
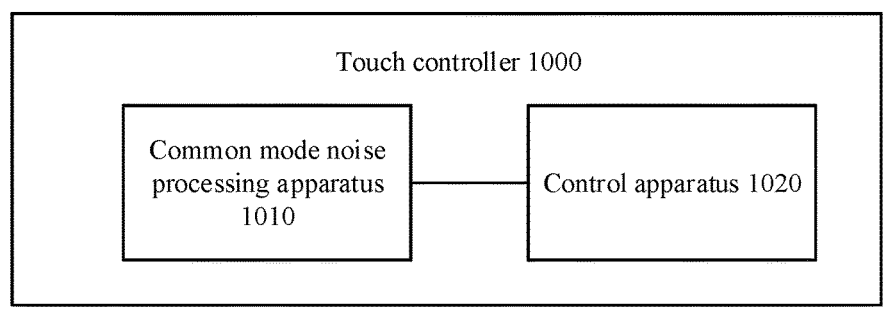
FIG. 10 is a schematic diagram of a structure of a touch controller of an embodiment of the present disclosure.

FIG. 10 is a schematic diagram of a structure of a touch controller 1000 of an embodiment of the present disclosure. It should be understood that the touch controller 1000 shown in FIG. 10 is merely an example, and the touch controller of the embodiment of the present disclosure may further include other modules or units, or modules having similar functions to the modules in FIG. 10.

The touch controller 1000 includes a common mode noise processing apparatus 1010 and a control apparatus 1020, and the common mode noise processing apparatus 1010 may be any one of common mode noise processing apparatuses shown in FIGS. 2-9. That is, the common mode noise processing apparatus 1010 may be integrated in a touch control chip.

The common mode noise processing apparatus 1010 is configured to receive a sensing signal output by a touch screen for determining a location of a touch point on the touch screen and acquire a frequency component amplitude of a common mode noise of the sensing signal.

The control apparatus 1020 is configured to determine a frequency band within which a driving signal in a driving channel of the touch screen is located according to the frequency component amplitude and output a driving signal located in the frequency band to the driving channel of the touch screen, which is not repeatedly described here.

In the embodiment of the present disclosure, a subtraction is performed between signals in a plurality of sensing signals output by a touch screen to obtain common mode noises of two signals, respectively, and then a spectrum analysis is performed on these common mode noises to obtain a frequency component amplitude of frequency components of the common mode noises, so that subsequently one frequency band may be selected from a plurality of preconfigured frequency bands according to the frequency component amplitude. A touch controller may then output a driving signal that a frequency is located in the frequency bands when outputting driving signals to a touch panel next time, so as to reduce impact of the common mode noises on the driving signal, thus improving accuracy of sensing signals, and finally improving accuracy of point reporting generated by the touch controller.

Persons of ordinary skill in the art may be aware that, the exemplary units and algorithm steps described in combination with the embodiments disclosed here can be implemented by electronic hardware or a combination of computer software and electronic hardware. Whether the functions are executed in a manner of hardware or software depends on a particular application and a design constraint condition of the technical solutions. Persons skilled in the art may use different methods to implement the described functions for every particular application, but it should not be considered that such implementation goes beyond the scope of the present disclosure.

Persons skilled in the art may clearly understand that, for convenience and brevity of description, reference may be made to the corresponding procedure in the foregoing method embodiments for a detailed working procedure of the foregoing system, apparatus and unit, which is not repeatedly described here.

In the several embodiments provided in the present application, it should be understood that, the disclosed system, apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

The foregoing descriptions are merely specific embodiments of the present disclosure, but are not intended to limit the protection scope of the present disclosure. Any variation or replacement readily figured out by persons of ordinary skill in the art within the technical scope disclosed in the present disclosure shall fall within the protection scope of the present disclosure. Therefore, the protection scope of the present disclosure shall be subject to the protection scope of the claims.

What is claimed is:

1. A common mode noise processing apparatus, comprising s subtraction processing units, one spectrum analysis module and a frequency analyzer, wherein s is an integer greater than 0;

each of the subtraction processing units comprises two first input ports, one subtractor and one first output port, wherein the two first input ports are connected to the subtractor, and the subtractor is connected to the first output port;

the spectrum analysis module comprises s second input ports and at least one spectrum analyzer, wherein the s second input ports are connected to the at least one spectrum analyzer;

the first output port of the subtraction processing unit is connected to a second input port of the spectrum analysis module;

the two first input ports of the subtraction processing unit are configured to receive two first signals output by two output ports of a touch screen, the subtractor is configured to perform a subtraction between the two first signals received by the two first input ports to obtain a common mode noise of the two first signals, the first output port is configured to output the common mode noise of the two first signals to the connected second input port in the spectrum analysis module, and the first signal is a signal for determining a location of a touch point on the touch screen, wherein the touch screen is a capacitive touch screen and the first signal is a sensing signal output by a sensing channel of the capacitive touch screen;

the second input port of the spectrum analysis module is configured to receive the common mode noise output by the connected first output port, and the at least one spectrum analyzer is configured to perform a spectral analysis on the common mode noise received by the second input port to obtain a frequency component amplitude of at least one frequency component of the common mode noise; and the frequency analyzer is configured to determine a frequency band within which a driving signal in a driving channel of the capacitive touch screen is located according to the frequency component amplitude.

2. The common mode noise processing apparatus according to claim 1, wherein each of the subtraction processing units further comprises two analog front ends (AFEs);

the two AFEs are connected to the two first input ports in one-to-one correspondence, and the two AFEs are connected to the subtractor;

the two AFEs are configured to amplify the two first signals received by the two first input ports to obtain two amplified signals and output the two amplified signals to the subtractor; and the subtractor is configured to perform a subtraction between the two amplified signals output by the two AFEs to obtain a common mode noise of the two amplified signals.

3. The common mode noise processing apparatus according to claim 2, wherein each of the subtraction processing units further comprises two analog-digital converters (ADCs);

the two AFEs are connected to the two ADCs in one-to-one correspondence, and the two ADCs are connected to the subtractor;

the two ADCs are configured to sample the two amplified signals output by the two AFEs to obtain two digital signals; and the subtractor is specifically configured to perform a subtraction between the two digital signals output by the two ADCs to obtain a common mode noise of the two digital signals.

4. The common mode noise processing apparatus according to claim 1, wherein each of the subtraction processing units further comprises one AFE;

the subtractor is connected to the AFE, and the AFE is connected to the first output port;

the AFE is configured to amplify the common mode noise of the two first signals output by the subtractor to obtain an amplified common mode noise; and the first output port is specifically configured to output the amplified common mode noise to the connected second input port.

5. The common mode noise processing apparatus according to claim 4, wherein each of the subtraction processing units further comprises one ADC;

the AFE is connected to the ADC, and the ADC is connected to the first output port;

the ADC is configured to sample the amplified common mode noise output by the AFE to obtain a digital common mode noise; and the first output port is specifically configured to output the digital common mode noise to the connected second input port.

6. The common mode noise processing apparatus according to claim 1, wherein the spectrum analysis module comprises one spectrum analyzer, and the spectrum analysis module further comprises an adder;

the s second input ports are connected to the adder, and the adder is connected to the spectrum analyzer;

the adder is configured to add s common mode noises received by the s second input ports to obtain an accumulated common mode noise; and the spectrum analyzer is configured to perform a spectral analysis on the accumulated common mode noise to obtain a frequency component amplitude of at least one frequency component of the accumulated common mode noise.

7. The common mode noise processing apparatus according to claim 1, wherein the spectrum analysis module comprises s spectrum analyzers, and the s units spectrum analyzers are connected to the s second input ports in one-to-one correspondence;

each of the spectrum analyzers is configured to perform a spectral analysis on the common mode noise received by a corresponding connected second input port to obtain a frequency component amplitude of at least one frequency component of the common mode noise received by the connected second input port.

8. A processing method for a common mode noise, wherein the processing method is executed by a common mode noise processing apparatus, and the common mode noise processing apparatus comprises s subtraction processing units, one spectrum analysis module and a frequency analyzer, wherein s is an integer greater than 0; each of the subtraction processing units comprises two first input ports, one subtractor and one first output port, wherein the two first input ports are connected to the subtractor, and the subtractor is connected to the first output port; the spectrum analysis module comprises s second input ports and at least one spectrum analyzer, wherein the second input ports are connected to the at least one spectrum analyzer; and the first output port of the subtraction processing unit is connected to a second input port of the spectrum analysis module;

the processing method comprises:

receiving, by the two first input ports of the subtraction processing unit, two first signals output by two output ports of a touch screen, wherein the first signal is a signal for determining a location of a touch point on the touch screen, wherein the touch screen is a capacitive touch screen and the first signal is a sensing signal output by a sensing channel of the capacitive touch screen;

performing, by the subtractor of the subtraction processing unit, a subtraction between the two first signals received by the two first input ports to obtain a common mode noise of the two first signals;

outputting, by the first output port of the subtraction processing unit, the common mode noise to the connected second input port in the spectrum analysis module;

receiving, by the second input port, the common mode noise output by the connected first output port;

performing, by the at least one spectrum analyzer, a spectral analysis on the common mode noise received by the second input port to obtain a frequency component amplitude of at least one frequency component of the common mode noise; and determining, by the frequency analyzer, a frequency band within which a driving signal in a driving channel of the capacitive touch screen is located according to the frequency component amplitude.

9. The processing method according to claim 8, wherein each of the subtraction processing units further comprises two analog front ends (AFEs), the two AFEs are connected to the two first input ports in one-to-one correspondence, and the two AFEs are connected to the subtractor;

the processing method further comprises:

amplifying, by the two analog front ends AFEs, the two first signals received by the two first input ports to obtain two amplified signals and outputting the two amplified signals to the subtractor;

the performing, by the subtractor, a subtraction between the two first signals received by the two first input ports to obtain a common mode noise of the two first signals comprises:

performing, by the subtractor, a subtraction between the two amplified signals output by the two AFEs to obtain a common mode noise of the two amplified signals.

10. The processing method according to claim 9, wherein each of the subtraction processing units further comprises two analog-digital converters (ADCs), two AFEs are connected to the two ADCs in one-to-one correspondence, and the two ADCs are connected to the subtractor;

the processing method further comprises:

sampling, by the two ADCs, the two amplified signals output by the two AFEs to obtain two digital signals;

the performing, by the subtractor, a subtraction between the two first signals received by the two first input ports to obtain a common mode noise of the two first signals comprises:

performing, by the subtractor, a subtraction between the two digital signals output by the two ADCs to obtain a common mode noise of the two digital signals.

11. The processing method according to claim 8, wherein each of the subtraction processing units further comprises one AFE, the subtractor is connected to the AFE, and the AFE is connected to the first output port;

the processing method further comprises:

amplifying, by the AFE, the common mode noise of the two first signals output by the subtractor to obtain an amplified common mode noise;

the outputting, by the first output port, the common mode noise to the connected second input port comprises:

outputting, by the first output port, the amplified common mode noise to the connected second input port.

12. The processing method according to claim 11, wherein each of the subtraction processing units further comprises one ADC, the AFE is connected to the ADC, and the ADC is connected to the first output port;

the processing method further comprises:
sampling, by the ADC, the amplified common mode noise output by the AFE to obtain a digital common mode noise;
the outputting, by the first output port, the common mode noise to the connected second input port comprises:
outputting, by the first output port, the digital common mode noise to the connected second input port.

13. The processing method according to claim 12, wherein the spectrum analysis module comprises one spectrum analyzer, the spectrum analysis module further comprises one adder, the s second input ports are connected to the adder, and the adder is connected to the spectrum analysis unit;
the processing method further comprises:
adding, by the adder, s common mode noises received by the s second input ports to obtain an accumulated common mode noise;
performing, by the at least one spectrum analyzer, a spectral analysis on the s common mode noises received by the s second input ports to obtain a frequency component amplitude of at least one frequency component of the s common mode noises comprises:
performing, by the spectrum analyzer, a spectral analysis on the accumulated common mode noise to obtain a frequency component amplitude of at least one frequency component of the accumulated common mode noise.

14. The processing method according to claim 8, wherein the spectrum analysis module comprises s spectrum analyzers, and the s spectrum analyzers are connected to the s second input ports in one-to-one correspondence;
each of the spectrum analyzers is configured to perform a spectral analysis on the common mode noise received by the connected second input port to obtain a frequency component amplitude of at least one frequency component of the common mode noise received by the connected second input port.

15. A touch controller, comprising:
a common mode noise processing apparatus, comprising:
s subtraction processing units and one spectrum analysis module, wherein s is an integer greater than 0;
each of the subtraction processing units comprises two first input ports, one subtractor and one first output port, wherein the two first input ports are connected to the subtractor, and the subtractor is connected to the first output port;
the spectrum analysis module comprises s second input ports and at least one spectrum analysis unit, wherein the s second input ports are connected to the at least one spectrum analysis unit;
the first output port of the subtraction processing unit is connected to a second input port of the spectrum analysis module;
the two first input ports of the subtraction processing unit are configured to receive two sensing signals output by two output ports of a touch screen, the subtractor is configured to perform a subtraction between the two sensing signals received by the two first input ports to obtain a common mode noise of the two sensing signals, the first output port is configured to output the common mode noise of the two sensing signals to the corresponding second input port, and the sensing signal is configured for determining a location of a touch point on the touch screen; and
the second input port of the spectrum analysis module is configured to receive the common mode noise output by the connected first output port, and the at least one spectrum analyzer is configured to perform a spectral analysis on the common mode noise received by the second input port to obtain a frequency component amplitude of at least one frequency component of the common mode noise.

* * * * *